Aug. 19, 1924.

S. A. TABET

DEVICE FOR ATTACHMENT TO PUMPS

Filed Oct. 20, 1923

1,505,819

Inventor
S. A. Tabet.
By
Attorney

Patented Aug. 19, 1924.

1,505,819

UNITED STATES PATENT OFFICE.

SAHLIAH A. TABET, OF BOYNTON, FLORIDA.

DEVICE FOR ATTACHMENT TO PUMPS.

Application filed October 20, 1923. Serial No. 669,871.

*To all whom it may concern:*

Be it known that I, SAHLIAH A. TABET, residing at Boynton, in the county of Palm Beach, State of Florida, a native of Syria, and technically a citizen of that country, but who has declared his intention of becoming a citizen of the United States, have invented certain new and useful Improvements in Devices for Attachment to Pumps, of which the following is a specification, reference being had to the accompanying drawing, forming a part thereof.

My invention relates to improvements in pump attachments and has for its object to provide a very simple, sturdy, and easily attached device for increasing the speed of operation of the ordinary vertical cylinder water pump. This pump attachment is designed to be operated by hand, motor, wind mill, gas engine, or foot power, and is provided with a suitable hand crank, a pulley and a flywheel.

Referring to the drawing:—

Figure 1:
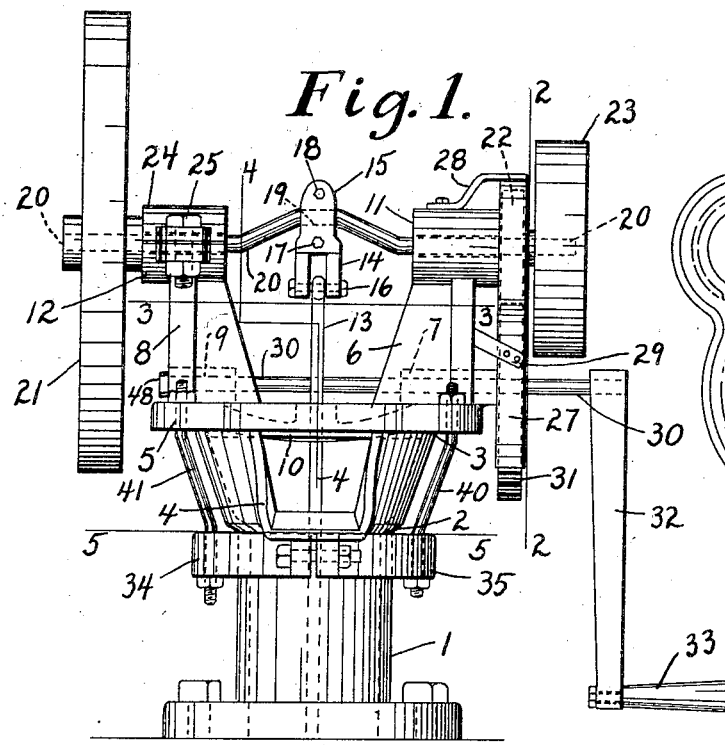
Fig. 1 is a front elevation view of the head of a water pump with my pumping attachment fastened thereto.

A common type of pump head, like that shown, is a single casting consisting of a cylindrical portion 1 with a base, a shoulder 2, an inverted conical portion connecting the shoulder 2 and the top 3, and a spout 4.

Upon the top 3 of this pump head is placed the cap 5 of my pump attachment. This cap 5 is a single casting having first, the T-section upright 6 carrying the rounded bearing carrier 11; second, the T-section upright 8 carrying the lower half 12 of a split bearing holder; third, the bearing holders 7 and 9; fourth, the bearing 47; and fifth, the ring shoulder 10. A suitable single throw crankshaft 20 is placed with one end through the bearing in holder 11 and the other end on the lower half of the split bearing in holder 12. The top half of the split bearing in holder 24 is then put in place, and the bearing bolted together by means of bolts 25 and 26.

Figure 2:
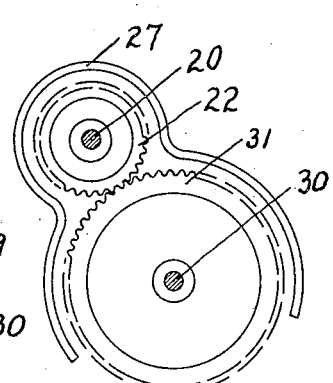
Fig. 2 is a partial sectional view on the line 2—2 of Fig. 1 showing the gearing.
Figure 3:
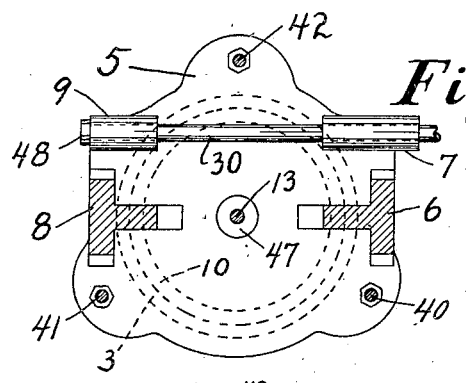
Fig. 3 is a plan view, a partial section being taken on the line 3—3 of Fig. 1.

The flywheel 21 is fastened on the shaft 20 as shown. A gear 22 and a pulley 23 are fastened on the other end of shaft 20. The forked connection 14 is made with a half bearing whose other half 15 is bolted on by bolts 17 and 18. The portion 19 of the crank shaft 20 is turned to somewhat smaller diameter than the rest of the shaft in order to keep the connection 14 in position. The pump rod 13 works through the slide bearing 47 and on the bolt 16 through the forks of the connection 14. A straight shaft 30 to which is fastened the crank 32 having the handle 33 carries the gear 31 which meshes with gear 22 on shaft 20. The shaft 30 turns in bearings in the bearing holders 7 and 9 and has at its end a suitable collar 48 which serves to keep the shaft 30 from being pulled out. As can be seen in Fig. 2, the gear 31 is larger than gear 22 so that shaft 20 is caused to revolve at greater speed than shaft 30. A suitable gearing guard 27 is held in the proper position by means of the supports 28 and 29 which are bolted to the main support 6—11.

Figure 4:
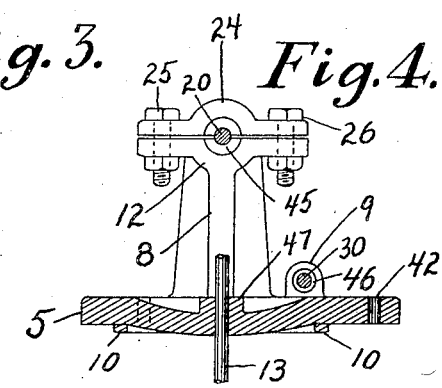
Fig. 4 is a side elevation view, a section being taken on the line 4—4 of Fig. 1.
Figure 5:
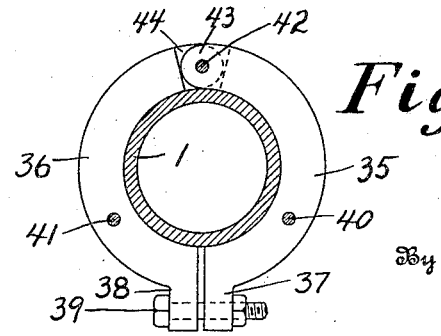
Fig. 5 is a plan view of the pump collar with a section on the line 5—5 of Fig. 1.

A two piece collar 35 and 36 (Fig. 5) has a suitable lap or tongue joint 43—44 which hinges on the bolt 42. On the opposite side from the hinge joint 43—44, the collar 35—36 has lugs 37 and 38 which are drawn together by the bolt 39, thereby causing the collar to grip tightly the cylindrical portion 1 of the pump head. With the collar 35—36 in position, the pump cap 5 is bolted down on the pump top 3 by means of the three bolts 40, 41 and 42. The ring shoulder 10 fits inside of the pump top 3 and serves to hold the pump cap 5 in its proper position. As is shown in Fig. 4, the bearing holder 9 carries the bearing 46 which holds the shaft 30, and the split bearing holder 12—24 carries the split bearing 45 which holds the shaft 20. It is preferable to have all bearings made from bronze or other good bearing metal.

Having thus described my invention, what I claim is:

1. In a pump attachment, the combination of a frame comprising a base, a collar below the base adapted to be clamped around the body of the pump and attached to the base by means of bolts, vertical uprights attached to the base, bearings at the extreme ends of the uprights, a shaft journalled in said bearings having a crank formed therein midway between the bearings and provided with a pitman for attachment to the pump rod and means for rotating the shaft.

2. In a pump attachment, the combination of a frame comprising a base adapted to rest on a pump head, a collar below the base adapted to be clamped around the body of the pump and attached to the base by means of bolts, T-section uprights attached to the base, one solid and one cap bearing attached to the extreme ends of the uprights, a shaft journalled in said bearings having a crank formed therein midway between the bearings and provided with a pitman for attachment to the pump rod, a flywheel on one end of the shaft and outside the uprights, a pulley on the other end of the shaft and means for rotating the shaft.

3. In a pump attachment, the combination of a frame, comprising a base adapted to fit on a pump head, a collar below the base adapted to be clamped tightly around the body of the pump and attached to the base by means of bolts, T-section uprights attached to the base, one solid and one cap bearing attached to the extreme ends of the uprights, a shaft journalled in said bearings having a crank formed therein midway between the bearings provided with a pitman for attachment to the pump rod, a flywheel on one end of the shaft and outside the upright and a pulley on the other end of the shaft and outside the upright, a pinion gear interposed between the outside of the bearing and the inside of the pulley, said pinion meshing with a gear rigidly attached to a lower shaft which is journalled in bearings attached to the base rearward of the uprights, and means for rotating the shaft carrying the gear.

In testimony whereof I hereunto affix my signature.

SAHLIAH A. TABET.